Feb. 23, 1971    F. R. McFARLAND    3,564,711
PIPE CUTTING TOOL
Filed April 19, 1968
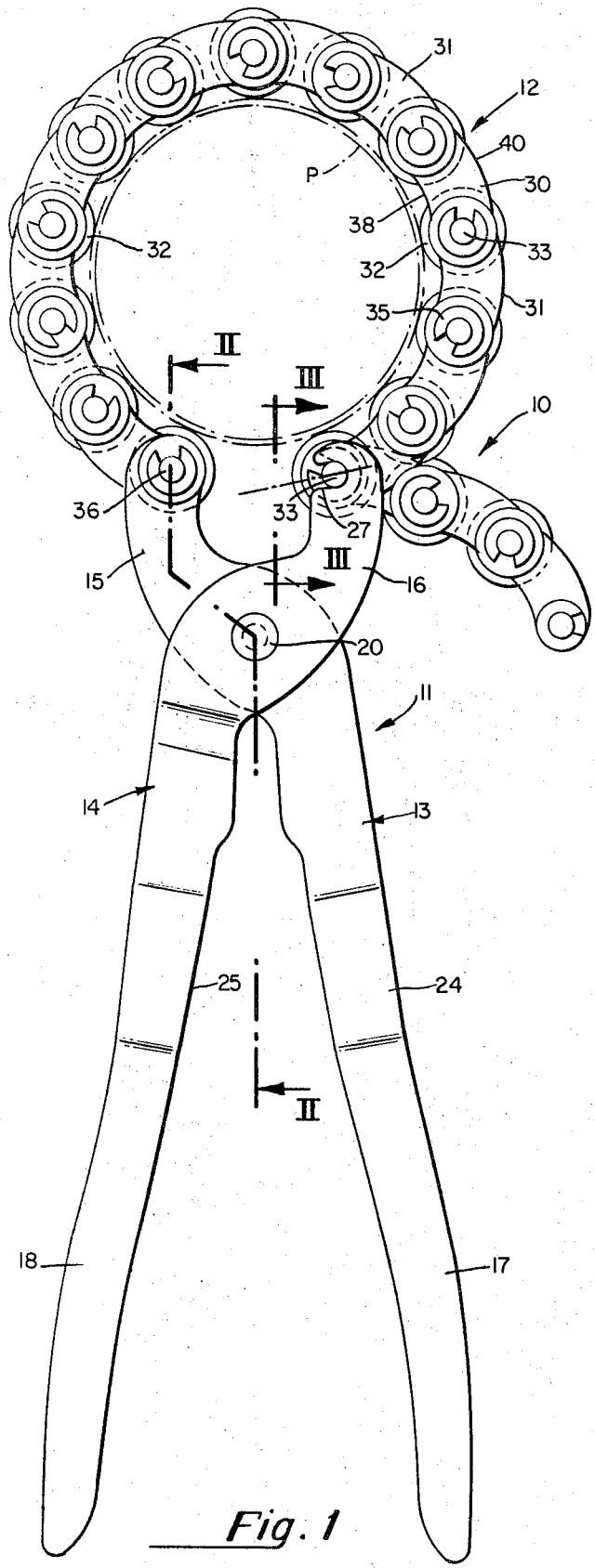
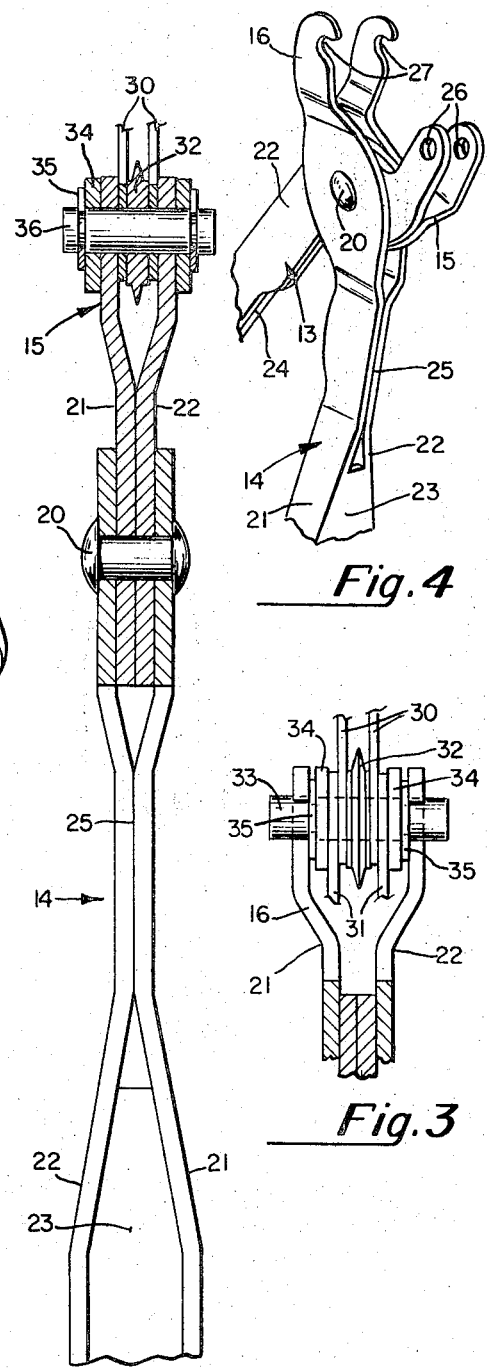
INVENTOR.
Frederick R. McFarland
BY
Paul + Paul
ATTORNEYS.

United States Patent Office 3,564,711
Patented Feb. 23, 1971

3,564,711
PIPE CUTTING TOOL
Frederick R. McFarland, Lancaster, Pa., assignor to K-D
 Manufacturing Company, Lancaster, Pa., a corporation of Pennsylvania
Filed Apr. 19, 1968, Ser. No. 722,733
Int. Cl. B23d *21/06;* B26b *27/00;* B26d *3/16*
U.S. Cl. 30—100           1 Claim

ABSTRACT OF THE DISCLOSURE

A tool is provided, utilizing a pliers-like hand operable portion in combination with a link chain, with rotatable cutting elements carried at each end of each of the chain links, and with the chain being adapted to be wrapped around pipe and the like which is to be cut, with one end of the chain carried by the pliers-like tool portion, and with various selected other portions of the chain being adapted to be engaged by a jaw of the pliers-like member, for setting the working size of the chain in accordance with the diameter of pipe which is to be cut, with the tool being adapted to be grasped and tightened thereby providing a tightening action of the chain against the pipe. The tool may then be worked back and forth to enable the rotating cutting elements to cooperate together in providing a single circular score line around the outside of the pipe which is to be cut, until the pipe is cut through.

BACKGROUND OF THE INVENTION

In many pipe-cutting operations and the like, it is particularly desirable to have a tool which is adapted for hand use, as opposed to a machine tool, for cutting pipe to desired length. In particular, such has been found to be desirable in the automotive industry, and most particularly with respect to the repair and replacement of exhaust systems in automobiles. Frequently, exhaust tailpipes of automobiles become so corroded that various tail-type portions must be cut away from the remainder of the exhaust system, prior to removal and replacement, for example, of a muffler. Because of the corrosion problem beneath automobiles, screw clamps and the like often becomes stuck or frozen and the only practical and expedient way to remove a muffler is to cut away adjacent tail pipe portions. Because of the particular geometry of most automobiles, their exhaust systems and especially the muffler mountings therefor are so positioned that conventional cutting tools such as hacksaws and the like prove to be ineffective as a means for cutting the tail pipes. In cutting tail pipes in situ, i.e., beneath an automobile, it becomes necessary to have a hand-operated tool which is readily actuable by a mechanic, and which may be readily adjusted to handle pipes of various sizes, with the tool being especially adapted for being utilized in the close quarters and strategic locations wherein automotive mufflers are often located.

Prior art types of pipe severing apparatus have been developed utilizing chain-type cutters with manually actuable tools, but such are generally of complicated and costly construction, often requiring various adjustments in order to effectuate their operation and often not being adapted to be operated by a single hand of a mechanic. Also, pipe cutting tools of prior art types generally do not maximize the effective force-transmitting capabilities and geometry of their chain links between cutting elements in the chain. Even further, prior art devices do not effectively secure the adjustably connectable end of the cutting chain to the associated end of the chain-engaging tool, in order to preclude accidental slippage of the chain therefrom.

SUMMARY OF THE INVENTION

The present invention seeks to overcome the above and other disadvantages of prior art types of pipe cutters in providing a tool which utilizes a cutter chain in conjunction with a pliers-like member having chain-engaging jaws at one end thereof and a graspable portion at another end, wherein the pliers-like member is constructed of opposed levers which are cross-connected at a single pivot point, such that upon squeezing the levers together at one end, the cutting forces are directed inwardly at the other end of the levers, to simply and effectively direct cutting forces about the periphery of a pipe.

Accordingly, it is a primary object of this invention to provide a novel tool comprising a pliers member and a cutter chain, wherein one end of the pliers member is adapted for engaging chain portions, another end of the pliers member is adapted to be grasped by the hand of a user, with the pliers member being cross-connected at a single pivot point between ends thereof.

It is a further object of this invention to accomplish the above object, wherein one end of the cutter chain is so engaged with the pliers member to be releasably received therein, but securely received against accidental disengagement.

It is a further object of this invention to accomplish the above objects, wherein the chain links are constructed of arcuate configuration, being substantially of constant transverse cross section between pivot ends thereof, for most effectively transmitting cutting forces through the chain.

It is yet a further object of this invention to accomplish the above objects, wherein the pliers member is constructed of two levers, each of which is of one-piece sheet metal construction, for economy of manufacture.

In the drawings:

FIG. 1 is a front view of the tool of this invention, with the pliers member being disposed beneath a piece of pipe to be cut, with the pipe being illustrated in end view in phantom lines, and with the link chain being disposed in wrapped-around condition relative to the pipe.

FIG. 2 is an enlarged fragmentary longitudinal sectional view of a portion of the link chain and pliers member of this invention, taken generally along the line II—II of FIG. 1, and wherein the fixed connection of one end of the link chain to one of the pliers jaws is clearly illustrated, as well as the pivot connection of the two lever members which comprise a pliers member.

FIG. 3 is an enlarged fragmentary view of a portion of the link chain and its associated cutting element in releasable engagement with one of the lever jaws of the pliers member of this invention.

FIG. 4 is a fragmentary perspective view of the chain-engaging end of the pliers member of this invention, with the link chain removed therefrom, for clarity of illustration.

Referring now to the drawings now in detail, reference is first made to FIG. 1, wherein the tool, generally designated by the numeral 10, is illustrated as comprising a pliers member 11 and a link chain 12.

The pliers member 11 includes a pair of opposed lever members 13 and 14, having respective chain-engaging jaw portions 15 and 16, and respective manually graspable portions 17 and 18, at their lower-most ends as viewed in FIG. 1.

The lever members 13 and 14 are cross-connected in scissors fashion, for relative pivotal movement about a single pivot point wherein a rivet 20 is disposed through the lever members 13 and 14.

The members 13 and 14 are each of one-piece sheet metal construction, for example of sheet steel or aluminum each having its lower or graspable portions 17 and 18 bent into inwardly-opening U-shaped configuration, to comprise opposed sidewalls 21 and 22, connected by an integral web 23, for providing rigidity to the handle portions 17 and 18 of the pliers member 11.

Opposed sidewalls 21 and 22 of each of the lever members 13 and 14 are joined together at respective mating surfaces 24 and 25 of respectively associated lever members 13 and 14, for the purpose of further rigidifying the lever members 13 and 14, near their pivot point 20.

The lever member 13 is constructed having opposed sidewalls 21 and 22 joined, in the vicinity of the pivoting rivet 20 with those sidewalls 21 and 22 being bifurcated above the vicinity of the pivoting rivet 20, as shown in the upper-most end of FIG. 2.

The opposed sidewalls 21 and 22 of the lever member 14 are bifurcated below the vicinity of the pivoting rivet 20, to pass and be connected to the sidewalls of the lever member 20, outside of the sidewalls 21 and 22 thereof, with upper-most portions of the lever member 14 being more widely spaced to comprise the jaw portion 16 thereof, as illustrated at the upper end of FIGS. 3 and 4.

Each side of the jaw portion 15 is provided with pin clearance holes 26, for receiving therein opposite ends of a terminal pin of the link chain 12. Each side of the jaw portion 16 of the lever member 14 is provided with a slotted hole 27, the slotted holes 27 opening toward the jaw 15 of the lever member 13, in such a manner that the slotted hole axis, if extended, would pass substantially beneath the axes of the holes 26 of the jaw portion 15 or somewhat rearwardly toward the gripping portion of the tool rather than opening toward the article to be engaged, as illustrated in FIG. 1. This assures positively locked engagement of a selected one of the link pins within the slotted holes 27 and prevents any selected one of the pins of the link chain 12 from accidental slippage or removal from the clearance holes 27, under the large forces which will be exerted on the link chain 12, as opposed handle portions 17 and 18 of the pliers member 11 are squeezed together.

The link chain 12 is constructed of a plurality of link pairs 30 and 31, the link pairs 30 comprising the inner-most links, and the link pairs 31 comprising the outer-most links, with a rotatable cutting element 32 being disposed between the inner-most link pairs 30, mounted on a pin 33 which connects adjacent ends of the inner-most and ouer-most link pairs 30 and 31, with washers 34 and lock washers 35 being disposed at each end of the pin 33, outwardly of the outer-most links 31.

With reference to FIG. 1, alternate pairs of links 30 and 31 of the link chain 12 comprise inner-most links 30 and outer-most links 31 between pins 33, throughout the length of the chain 12.

Each of the alternate links 30 and 31 in the chain 12 is constructed in identical fashion, as is their respective connections to pins 33, with the exception of the terminal pin 36, which is permanently engaged within the pin holes 26 of the jaw portion 15 of the lever member 13. Because the opposed sidewall portions 21 and 22 of the jaw portion 15 are more closely spaced than are the corresponding sidewall portions of the jaw portion 16, the sidewall portions 21 and 22 of the jaw portion 15 are engaged directly against the outer surfaces of the inner link members 30, with the washers 34 being disposed outwardly of the jaw sidewall portions, and with the lock washers 35 being disposed in associated pin grooves outwardly of the washers 34.

It is readily seen, from the above, that any of the pins 33 may be engaged within the slotted holes 27, depending upon the outer diameter of the pipe P (illustrated in phantom) which is to be severed. It will be appreciated, that when the link chain 12 is disposed about a pipe P, with one of the pins 33 disposed as illustrated in slotted holes 27, and opposed handle portions 17 and 18 of the pliers member 11 are grasped and squeezed together, substantial forces will be exerted on the link chain 12, through opposed lever member jaw portions 15 and 16, under the force multiplication exemplified by lever action. Also, because such forces are exerted on individual chain links 30 and 31, while the chain 12 is wrapped about the pipe P, it becomes desirable to have a maximum amount of material comprising the links 30 and 31 which connect the pins 33. However, this maximum amount of material must be supplied without enlarging conventional chain links to a point whereby, when the link chain 12 is wrapped about a pipe P, the links 30 and 31 would engage against the surface of the pipe P rather than the cutting elements 32. Accordingly, it has been found that to make the inner-most edge surface of each of the links 30 and 31 to be of arcuate configuration, to be free of striking the outer surface of a pipe P which is to be cut, but yet which provides a maximum amount of material in each of the links 30 and 31 connecting the pins 33, along the inner-most edge surfaces 38 of the links 30 and 31. The outer edge surfaces 40 of the links 30 and 31 are also of arcuate configuration in order that the links 30 and 31 may be of substantially constant transverse cross section between the pin pivot point, for uniform distribution of cutting forces through the links 30 and 31.

The tool 10 is used by wrapping a link chain 12 around a pipe P, as illustrated in FIG. 1, with one of the pins 33 in engagement within the slotted holes 27 of jaw portions 16, and appropriate pin 33 having been thus selected, depending upon the outside diameter and wall thickness of the pipe P, and the handle portions 17 and 18 of the pliers member 11 are then firmly grasped and squeezed together with the tool 10 being rocked in a back-and-forth motion through an arc of for example, 15° or 20°, until the cutting elements 32 have created an aggregate score line about the pipe P, of a depth sufficient to sever the pipe P into two components.

It will be appreciated by those skilled in the art that various modifications may be made in the details of construction and use or operation of the tool of this invention, all within the spirit and scope of the invention, as recited in the appended claim.

I claim:

1. A pipe cutting tool for cutting pipe of various sizes comprising a pliers member and a cutter chain, said pliers member comprising a pair of pliers levers each having a chain-engaging jaw thereon and a graspable portion at an opposite end, said levers being cross-connected in scissors fashion at a single pivot point, wherein said cutter chain includes a plurality of rotatable cutting elements, wherein said jaw of one said lever member pivotally engages an end-most link of said cutter chain, and said jaw of said other lever includes slotted hole means for receivably and releasably engaging selected links of said chain, said slotted hole means opening toward said jaw of said one lever member, wherein said cutter chain comprises a plurality of links with adjacent ones connected at ends thereof at pivot points, the links each being of arcuate configuration and of substantially constant transverse cross section between pivot points, wherein said slotted hole means opens at least partially rearwardly away from the position of an article to be cut, and is directed at least partially rearwardly of link-engaging pivotal portions of the opposing jaw member, wherein said pliers member consists solely of said pair of pliers levers and pivot point connecting means, wherein each of said levers is of one-piece sheet metal construction having its jaws comprising laterally spaced jaw halves for engaging opposite ends of chain pins with chain portions disposed between the laterally spaced jaw halves.

References Cited

UNITED STATES PATENTS

| | | | |
|---|---|---|---|
| 1,510,256 | 9/1924 | Conning | 30—100 |
| 2,159,715 | 5/1939 | Sherrill | 30—100 |
| 2,836,887 | 6/1958 | Wheeler | 30—100X |
| 3,084,573 | 4/1963 | Lipski | 81—3.43 |

FOREIGN PATENTS

| | | |
|---|---|---|
| 4,318 | 1/1897 | Great Britain. |

JAMES L. JONES, JR., Primary Examiner